US011995736B2

(12) United States Patent
Jeong et al.

(10) Patent No.: US 11,995,736 B2
(45) Date of Patent: May 28, 2024

(54) METHOD AND SYSTEM FOR EVACUATION ROUTE GUIDANCE OF OCCUPANTS USING AUGMENTED REALITY OF MOBILE DEVICES

(71) Applicant: National Disaster Management Research Institute, Ulsan (KR)

(72) Inventors: Gunsik Jeong, Ulsan (KR); Sunggeun Bae, Ulsan (KR); Wonkyu Oh, Ulsan (KR); Subin An, Ulsan (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 263 days.

(21) Appl. No.: 17/537,524

(22) Filed: Nov. 30, 2021

(65) Prior Publication Data

US 2023/0145066 A1 May 11, 2023

(30) Foreign Application Priority Data

Nov. 9, 2021 (KR) ........................ 10-2021-0152855

(51) Int. Cl.
*G06Q 90/00* (2006.01)
*G06F 3/01* (2006.01)
(Continued)

(52) U.S. Cl.
CPC ........... *G06Q 90/205* (2013.01); *G06F 3/011* (2013.01); *G06T 19/006* (2013.01); *G06V 20/20* (2022.01);
(Continued)

(58) Field of Classification Search
CPC ...... G06Q 90/205; G06Q 50/10; G06F 3/011; G06F 3/14; G06F 3/017; G06T 19/006;
(Continued)

(56) References Cited

U.S. PATENT DOCUMENTS

| 2015/0348220 | A1* | 12/2015 | Sharma | .............. G01C 21/3407 705/324 |
| 2020/0288532 | A1* | 9/2020 | Wang | ...................... G06T 19/00 |
| 2021/0046650 | A1* | 2/2021 | Deyle | .................. G06Q 10/087 |

FOREIGN PATENT DOCUMENTS

| EP | 3149716 B1 | 8/2020 |
| JP | 2008269336 A | 11/2008 |

(Continued)

*Primary Examiner* — Florian M Zeender
*Assistant Examiner* — Emily M. Kraisinger
(74) *Attorney, Agent, or Firm* — STIP Law Group, LLC

(57) ABSTRACT

The present invention is a system guiding an evacuation route for occupants using an augmented reality of mobile devices. The system includes: an occupant's mobile device installed with an evacuation guidance application for showing an evacuation route from a current location of the occupant to an evacuation point in the occurrence of a disaster; and a server providing a plurality of evacuation route information to the mobile device, wherein the mobile device executes the evacuation guidance application to display an evacuation guidance interface, displays a captured landscape image on an image display area of the evacuation guidance interface, displays one of the plurality of evacuation routes set based on specific information related to the type of disaster, the user's exercise ability, and personal conditions on a map display area of the evacuation guidance interface.

8 Claims, 16 Drawing Sheets

(51) Int. Cl.
*G06T 19/00* (2011.01)
*G06V 20/20* (2022.01)
*G08B 7/06* (2006.01)
*H04W 4/02* (2018.01)
*H04W 4/024* (2018.01)
*H04W 4/90* (2018.01)

(52) U.S. Cl.
CPC .............. *G08B 7/062* (2013.01); *G08B 7/066* (2013.01); *H04W 4/024* (2018.02); *H04W 4/027* (2013.01); *H04W 4/90* (2018.02)

(58) Field of Classification Search
CPC ........ G06V 20/20; G08B 7/062; G08B 7/066; H04W 4/024; H04W 4/027; H04W 4/90; H04W 4/02; G01C 21/206; G01C 21/365; G01C 21/3697
See application file for complete search history.

(56) References Cited

FOREIGN PATENT DOCUMENTS

| | | | | | |
|---|---|---|---|---|---|
| JP | 2010002996 | A | | 1/2010 | |
| JP | 2011221959 | A | | 11/2011 | |
| JP | 2016008894 | A | * | 1/2016 | .............. A62B 3/00 |
| JP | 2016008894 | A | | 1/2016 | |
| JP | 2017067457 | A | | 4/2017 | |
| JP | 2018045519 | A | | 3/2018 | |
| JP | 2021033981 | A | | 3/2021 | |
| JP | 2021071925 | A | | 5/2021 | |
| JP | 2021163421 | A | | 10/2021 | |
| KR | 20130085653 | A | | 7/2013 | |
| KR | 20160018027 | A | | 2/2016 | |
| KR | 20160018027 | A | * | 2/2016 | |
| KR | 20160046556 | A | * | 4/2016 | |
| KR | 20160046556 | A | | 4/2016 | |
| KR | 101822789 | B1 | | 3/2018 | |
| KR | 101831874 | B1 | | 3/2018 | |
| KR | 101895569 | B1 | | 9/2018 | |
| KR | 20180122300 | A | | 11/2018 | |
| KR | 20190087719 | A | | 7/2019 | |
| KR | 20190101228 | A | * | 8/2019 | |
| KR | 20190138222 | A | | 12/2019 | |
| KR | 102124097 | B1 | | 6/2020 | |

* cited by examiner

METHOD AND SYSTEM FOR EVACUATION ROUTE GUIDANCE OF OCCUPANTS USING AUGMENTED REALITY OF MOBILE DEVICES

TECHNICAL FIELD

The present disclosure relates to a method and a system for evacuation guidance of occupants using augmented reality of mobile devices.

CROSS-REFERENCE TO RELATED APPLICATIONS

This application claims the priority of the Korean Patent Applications NO 10-2021-0152855 filed on Nov. 9, 2021, in the Korean Intellectual Property Office, the disclosure of which is incorporated herein by reference.

BACKGROUND

Along with the rapid industrial development, advances of society, and increase of the population, medium- and large-scale buildings such as cultural, commercial, and residential facilities grow in size and provide multi-purpose uses. Accordingly, the inside of a building is complex, and users often encounter difficulty finding a route inside the building. These features of today's buildings may exacerbate the confusion to the activity of evacuating and rescuing users of the corresponding building, particularly in the event of a disaster such as fire, gas leak, earthquake, or terror attack. Therefore, there has arisen a need for an evacuation route guidance system that evacuees may count on in a disaster situation inside a complex, medium- or large-scale building. Recently, as evacuation-related technologies have advanced in various fields, it has become possible to design an evacuation route guidance system that more actively responds to disaster situations. The evacuation-related technologies currently developed include 5 communication technology that determines the indoor location of an evacuee, sensor technology that senses a disaster, sensor technology that evaluates the risk of building collapse, and technology that monitors the spread of a disaster. In addition, by integrating Building Information Modeling (BIM)-based smart construction for building facility management with the evacuation-related technology currently developed, the situation inside a building may be comprehended. This situation-awareness allows designing a new evacuation route guidance system. The prior art focuses on predicting a disaster situation indoors; therefore, the prior art has difficulty providing an evacuation route suitable for evacuees in a chaotic situation such as a disaster situation. Recently, to solve this problem, Korean registered patent No. 10-2124097 disclosed a method that detects smoke or flames using an IoT sensor and guides an evacuation route in real-time through an occupant's smartphone. However, considering dynamically changing disaster situations at various points on the evacuation route, an erroneous operation or damage of the IoT sensors due to fire or the like readily incapacitates the disclosed method in guiding an appropriate evacuation route. Moreover, Korean laid-open patent publication No. 10-2019-0138222 discloses a method for guiding an evacuation route in a building based on augmented reality through a smartphone. However, the disclosed method provides only a preset evacuation route and is not able to respond appropriately to an unexpected situation on the evacuation route by checking an unexpected situation in advance.

PRIOR ART REFERENCES

Patents (Patent 001) Korean registered patent publication No. 10-2124097
(Patent 002) Korean laid-open patent publication No. 10-2019-0138222
(Patent 003) European registered patent publication No. 3149716

SUMMARY

The present disclosure provides a method and a system for guiding an evacuation route for occupants using augmented reality of mobile devices, which enable the occupants in a building to evacuate quickly and safely in a disaster situation.

Also, the present disclosure provides a method and a system for guiding an evacuation route for occupants using augmented reality of mobile devices, which enable the occupants to evacuate through an alternative route by identifying an unexpected situation at a plurality of points on the evacuation route.

Also, the present disclosure provides a method and a system for guiding an evacuation route for occupants using augmented reality of mobile devices, which enable the occupants to evacuate safely by providing location information of various emergency items suitable for the type of disaster on the way of the evacuation and information on how to use the emergency items.

Also, the present disclosure provides a method and a system for guiding an evacuation route for occupants using augmented reality of mobile devices, which help evacuees quickly determine whether to evacuate through an alternative route by analyzing captured images of various points on the evacuation route using deep learning-based machine learning and determining the accessibility of the analyzed points for the evacuees.

Also, the present disclosure provides a method and a system for guiding an evacuation route for occupants using augmented reality of mobile devices, which enable evacuees with disabilities or children to receive information related to evacuation correctly by utilizing a plurality of evacuation guidance assisting devices installed on the ceiling or passageways inside a building and guiding evacuation to an emergency exit or an escape place in a disaster situation such as fire or earthquake, where messages are output audibly or visually by reflecting the situation specific to individuals or the current environmental conditions.

A system for guiding an evacuation route using augmented reality of mobile devices according to an embodiment of the present disclosure may comprise an occupant's mobile device installed with an evacuation guidance application for showing an evacuation route from a current location of the occupant to an evacuation point in the occurrence of a disaster; and a server providing a plurality of evacuation route information to the mobile device, wherein the mobile device executes the evacuation guidance application to display an evacuation guidance interface; displays a captured landscape image on an image display area of the evacuation guidance interface; displays one of the plurality of evacuation routes set based on specific information related to the type of disaster, the user's exercise ability, and personal conditions on a map display area of the evacuation guidance interface; and displays guide information for displaying a movement direction from a current location along an evacuation route indicated on the map display area by superimposing the guide information on the image display area together with the landscape image.

In another aspect, the present disclosure may provide a system for guiding an evacuation route using augmented reality of mobile devices, wherein the server prioritizes the plurality of evacuation routes based on specific information related to the type of disaster, the user's exercise ability, and personal conditions; and the mobile device displays one of the evacuation routes selected based on the priorities of the plurality of evacuation routes received from the server on the map display area.

In another aspect, the present disclosure may provide a system for guiding an evacuation route using augmented reality of mobile devices, wherein the mobile device receives location information of at least one emergency item related to the type of disaster from the server and displays the location information of an evacuation route on the map display area.

In another aspect, the present disclosure may provide a system for guiding an evacuation route using augmented reality of mobile devices, wherein, when the mobile device is located at a point on an evacuation route displayed on the map display area that matches the location at which the emergency item is disposed, the mobile device analyzes a captured image to determine whether an emergency item is detected within the captured image; displays an indication to facilitate identification of the emergency item when the emergency item is detected within the captured image; and displays a tag including information on how to use the detected emergency item.

In another aspect, the present disclosure may provide a system for guiding an evacuation route using augmented reality of mobile devices, wherein, when the mobile device is located at a point on an evacuation route displayed on the map display area that matches the location where the emergency item is disposed, the mobile device analyzes a captured image to determine whether an emergency item is detected in the captured image and transmits use completion information of the emergency item and location information of the emergency item completed for use to the server when the emergency item is not detected in the captured image; and to remove the location of an emergency item completed for use displayed on the evacuation route, the server transmits information of the emergency item completed for use and location information of the emergency item completed for use to the mobile devices of all occupants communicating with the server.

In another aspect, the present disclosure may provide a system for guiding an evacuation route using augmented reality of mobile devices, wherein the mobile device receives waypoint state images, which are images captured by other mobile devices at a plurality of different points on the remaining route from a current location to an evacuation point, from the server and displays the received images.

In another aspect, the present disclosure may provide a system for guiding an evacuation route using augmented reality of mobile devices, wherein the mobile device reconfigures an evacuation route that detours a point on a waypoint state image selected in response to a selection of the displayed waypoint state image and a route reconfiguration affordance and displays the reconfigured evacuation route on the map display area.

In another aspect, the present disclosure may provide a system for guiding an evacuation route using augmented reality of mobile devices, wherein waypoint state images displayed on the mobile device are updated periodically according to a location change of the mobile device.

In another aspect, the present disclosure may provide a system for guiding an evacuation route using augmented reality of mobile devices, wherein the number of waypoint state images transmitted from the server to the user's mobile device is determined based on the remaining distance from a current location of the mobile device to the evacuation point, the number of other users' mobile devices on the remaining route from the current location to the evacuation point, and separation distances among positions of other users' mobile devices.

In another aspect, the present disclosure may provide a system for guiding an evacuation route using augmented reality of mobile devices, wherein the server receives captured image data for the same point photographed by each of a plurality of users moving along the same evacuation route, analyzes the plurality of captured image data to detect environmental state information of the same point, and, if the same point is determined as an avoidance point through which movement is not appropriate, transmits a request for reconfiguring an evacuation route, location information of the avoidance point, and images capturing the avoidance point to the mobile devices of a plurality of users moving along the same evacuation route.

In another aspect, the present disclosure may provide a system for guiding an evacuation route using augmented reality of mobile devices further comprises an evacuation guidance assisting device paired with at least one mobile device located within a preconfigured radius, wherein the evacuation guidance assisting device receives specific information related to the type of disaster, the user's exercise ability, and personal conditions from the paired mobile device and provides audible and/or visual messages suitable for the user's conditions and a current situation.

In another aspect, the present disclosure may provide a system for guiding an evacuation route using augmented reality of mobile devices, wherein the mobile device calculates an average movement speed over a preconfigured distance and an amount of battery consumption of the mobile device consumed while moving the preconfigured distance by determining whether the movement of the preconfigured distance along the evacuation route has been completed, determines whether an estimated amount of battery consumption required for movement along the remaining route exceeds the amount of current battery charge, and executes a real-time disaster situation notification mode and a disaster situation battery consumption control mode if the estimate does not exceed the amount of current battery charge; the mobile device displays a messenger application having use records for a predetermined period and displays information on main conversation participants who have conducted a conversation for a preconfigured time by extracting the information in the messenger application, in response to selection of the displayed information on main conversation participants who have conducted a conversation, transmits real-time evacuation route information and location information of a current user to the selected main conversation participants, and executes a conversation mode with the selected main conversation participants if a response is received from the selected main conversation participants within a preconfigured time; and the mobile device determines whether biometric information of a pre-registered user is detected, maintains a display of the mobile device to be in a turned-on state when the biometric information is detected, transmits an image photographing the user and captured image of the front scene to the selected main conversation participants, and turns off the display and provides an audio guide of evacuation information while the biometric information is not detected.

The embodiment according to the present disclosure may provide a method and a system for guiding an evacuation route for occupants using augmented reality of mobile devices, which enable occupants located inside a building to evacuate quickly and safely in a disaster situation.

The embodiment according to the present disclosure may provide a method and a system for guiding an evacuation route for occupants using augmented reality of mobile devices, which enable occupants to evacuate via an alternative route by recognizing unexpected situations at a plurality of points on then evacuation route.

The embodiment according to the present disclosure may solve a problem of wasting time to collect already used emergency items in an emergency situation requiring a prompt response by providing location information of various emergency items suitable for the type of disaster located on an evacuation route and information on how to use the emergency items to the occupants so that the occupants may quickly recognize the locations of the emergency items during evacuation and by updating the location information of the emergency items according to whether the emergency items are in use or not.

The embodiment according to the present disclosure may determine a plurality of evacuation routes and their priority by considering the type of disaster, the user's exercise ability, and personal conditions and provide an evacuation route suitable for current circumstances and the user.

The embodiment according to the present disclosure enables a user to recognize actual situation information of a plurality of points on the remaining route through images while moving along an evacuation route, thus enabling the user to make a prompt decision on the current situation and accessibility of the points to be passed and enables the user to determine an alternative evacuation route that avoids points expected to be impossible to move through.

The embodiment according to the present disclosure analyzes a plurality of captured images photographing particular points on the same evacuation route using deep learning-based machine learning to determine the accessibility of the analyzed points and informs the user of the analysis result, thus enabling the user to quickly determine the degree of safety of a current evacuation route and a need for reconfiguring the evacuation route.

The embodiment according to the present disclosure enables evacuees with disabilities or children to receive information related to evacuation correctly by outputting messages relevant to the current circumstances and the user's specific situation through an evacuation guidance assisting device paired with the user's mobile device based on specific information related to the type of disaster, the user's exercise ability, and personal conditions.

DETAILED DESCRIPTION

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

Figure 1:
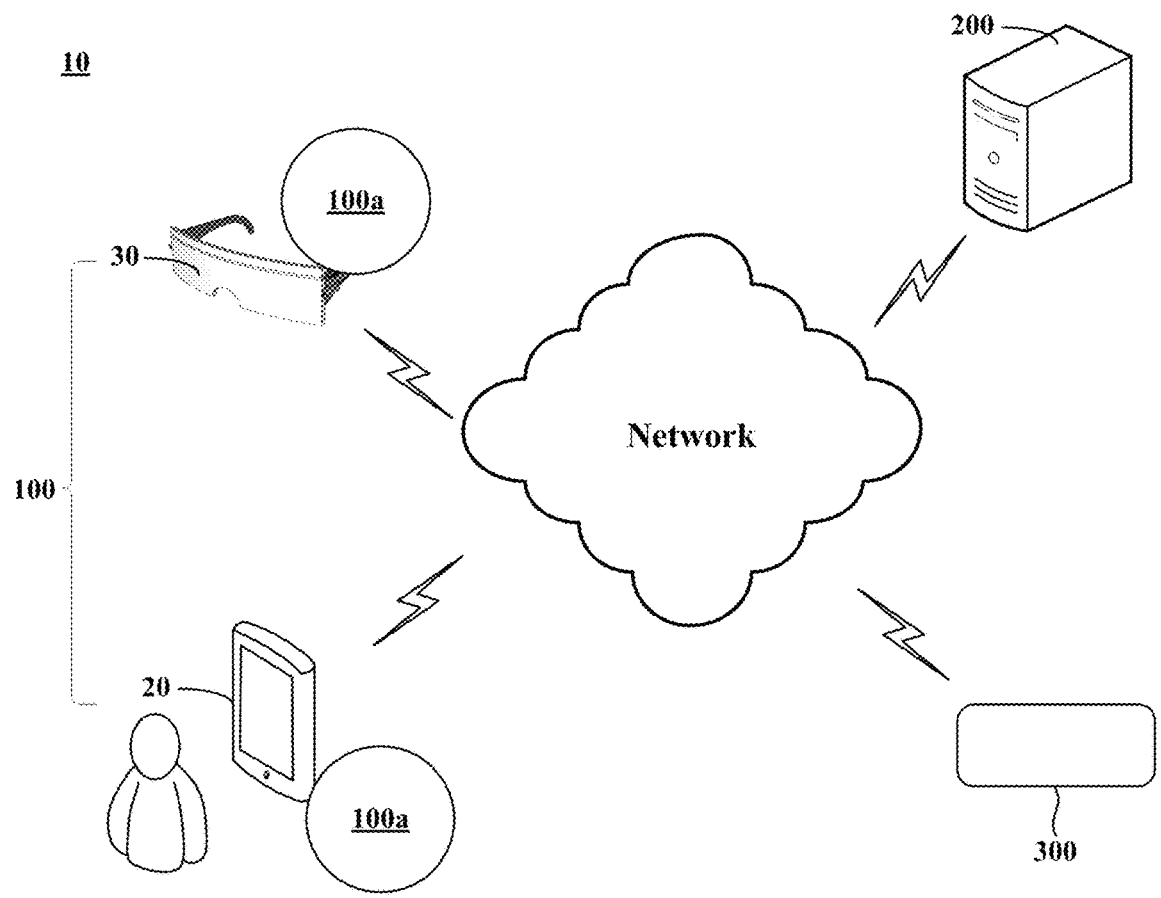
FIG. 1 is a block diagram illustrating the structure for implementing an evacuation guidance system according to one embodiment of the present disclosure.

FIG. 1 is a block diagram illustrating the structure for implementing an evacuation guidance system according to one embodiment of the present disclosure.

An evacuation guidance system 10 according to one embodiment may comprise a mobile device 100 and a server 200. According to various embodiments, the evacuation guidance system 10 may comprise a mobile device 100, a server 200, and an evacuation guidance assisting device 300.

The mobile device 100 and the server 200 are connected to each other through a communication line such as the Internet.

For example, the mobile device 100 may be a mobile terminal 20 such as a smartphone. The mobile device 100 may be a wearable computing device such as smart glasses 30 or a head-mounted display in various embodiments. The smart glasses 30 type mobile device 100 may have a display system that includes glasses transmitting the light for the user to see the surrounding physical space while the user wears the glasses and displaying virtual content (in the embodiment, various types of augmented reality-based information) in the user's field of view. The mobile device 100 may receive the user input. The mobile device 100 of the mobile terminal 20 type may include a physical button capable of receiving a physical input, a touch display capable of receiving a touch input, and a microphone system capable of receiving a voice command. Other smart glasses 30 type mobile devices 100 may include a gesture recognition system capable of recognizing a gesture from a user's hand gesture. The user may input a command signal to the smart glasses 30 through a gesture.

An evacuation guidance application 100a is installed in the mobile device 100 to realize the evacuation guidance system 10. In various embodiments, in response to knowing that the mobile device 100 is located in a predetermined building, a message regarding whether to download and install the evacuation guidance application 100a may be transmitted to the mobile device 100. The user may download and install the evacuation guidance application 100a on the mobile device 100 using the information or a link in the message.

The evacuation guidance application 100a is software for presenting an evacuation route from the current location of a user (occupant) to an evacuation point when a disaster such as fire or earthquake occurs in a building.

The user may start the evacuation guidance application 100a by a predetermined operation. By installing the evacuation guidance application 100a on the mobile device 100, the user may quickly arrive at a safe place such as an evacuation point even when the user encounters a sudden disaster.

The mobile device 100 includes at least one processor, a memory, a camera, a display device, various sensors, and a communication device. The processor provides the function of the evacuation guidance application 100a to the user by executing the evacuation guidance program stored in the memory. According to the execution of the evacuation guidance application 100a, the camera is driven to photograph the landscape.

The mobile device 100 may receive information on a plurality of evacuation routes from the server 200 and display an evacuation route suitable for the user through the display device.

FIGS. 2 to 6 illustrate various evacuation guidance interfaces displayed on a mobile device for helping a user move to an evacuation point safely along an evacuation route after an evacuation guidance application is executed on the mobile device.

Figure 2:
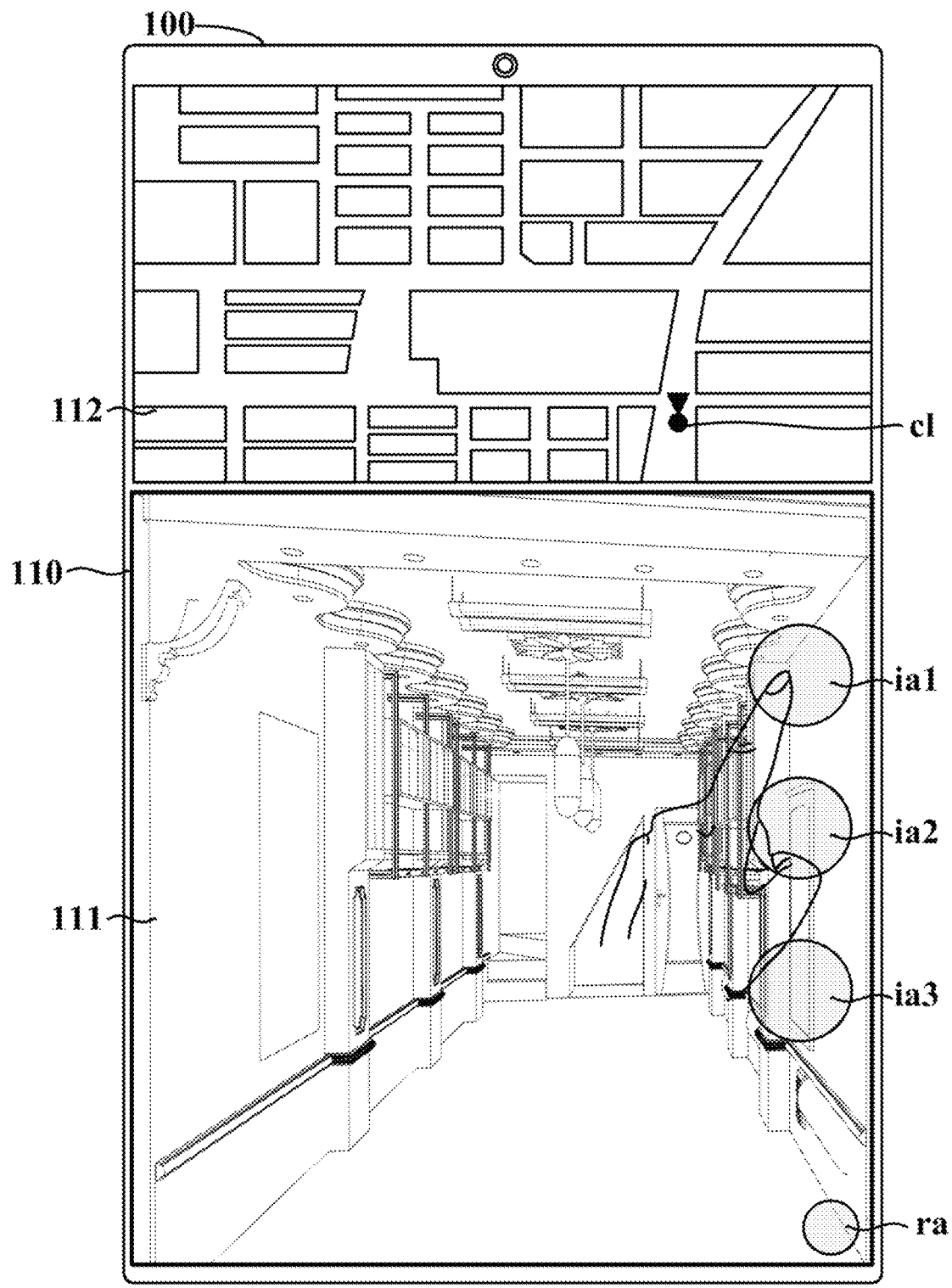
FIG. 2, FIG. 3, FIG. 4, FIG. 5 to FIG. 6 illustrate various evacuation guidance interfaces displayed on a mobile device for helping a user move to an evacuation point safely along an evacuation route after an evacuation guidance application is executed on the mobile device.

Referring to FIG. 2, when the user executes the evacuation guidance application 100a on the mobile device 100, the evacuation guidance interface 110 may be displayed. After that, the camera of the mobile device 100 may start photographing, and the photographed landscape image may be displayed through the display device. In addition, the mobile device 100 may display a map including the user's current location.

The user's current location may be the location of the mobile device 100 carried by the user. Various methods may determine the indoor location of the mobile device 100, including a position estimation method by analyzing sensing information of a geomagnetic sensor embedded in the mobile device 100, a Wi-Fi positioning method for estimating the location using surrounding Wi-Fi signals, a Wi-Fi/Bluetooth based fingerprinting-based positioning method belonging to the Wi-Fi/Bluetooth-based indoor positioning technique, a trilateration-based positioning method, and a positioning method using cameras. However, the present disclosure is not limited to the position estimation methods described above.

The captured landscape image is displayed on the image display area 111, and a map is displayed on the map display area 112. The image display area 111 and the map display area 112 may be displayed separately from each other. The figure illustrates an example in which the mobile device 100 is a mobile terminal 20. However, the present disclosure is not limited to the specific example. In the case of smart glasses 30, the image display area 111 and the map display area 112 may be displayed at different positions in various forms.

The map display area 112 may display current location information c1 of the mobile device 100. Also, the location information c1 may be changed on a map displayed on the map display area 112 according to a location change of the mobile device 100. In addition, the location information c1 may move in response to the movement of the mobile device 100.

Figure 3:
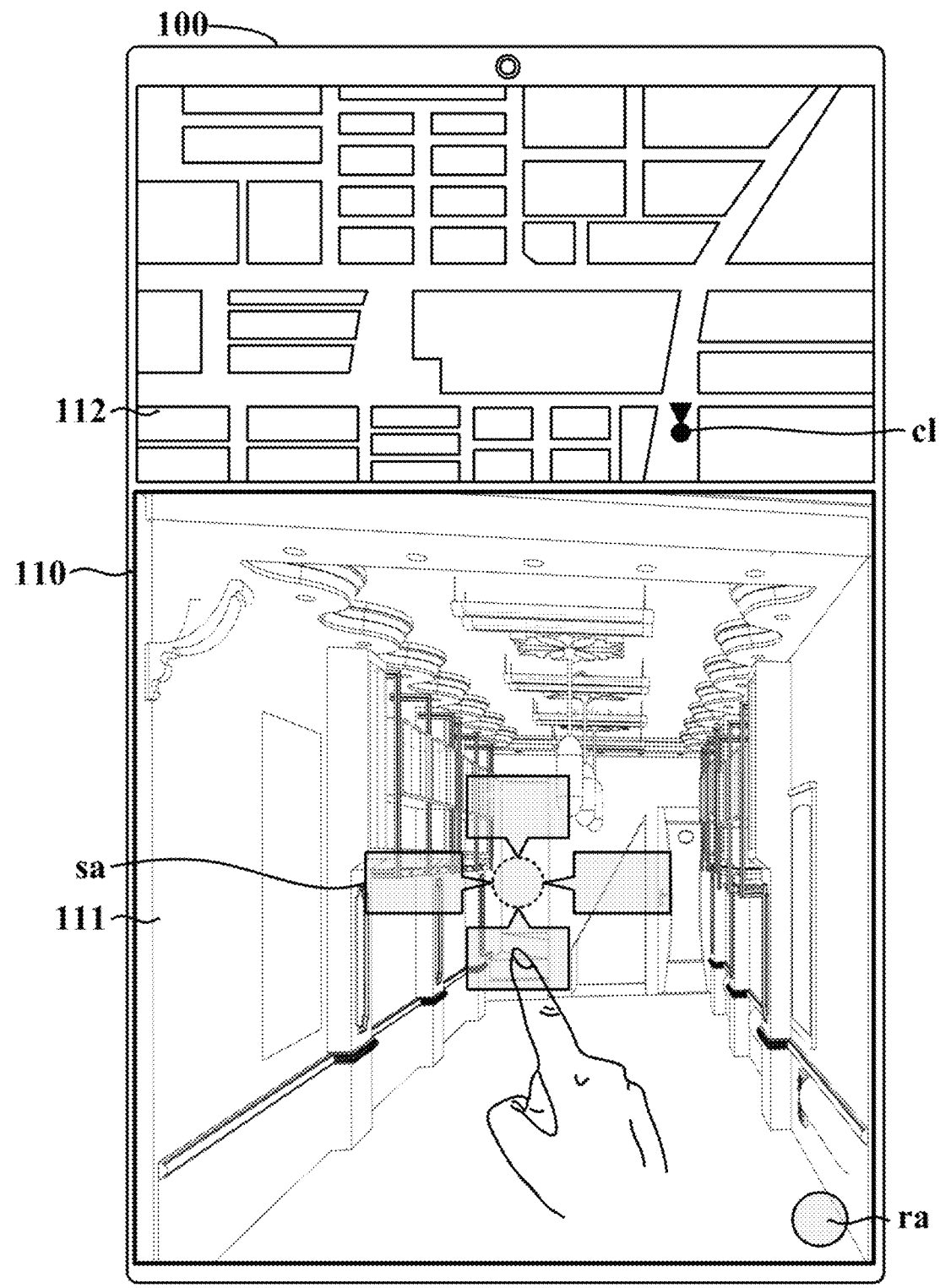

Referring to FIGS. 2 and 3, the evacuation guidance interface 110 may display a plurality of state input affordances ia1, ia2, and ia3 by superimposing them on a partial area of the landscape image displayed on the image display region 111. The evacuation guidance interface 110 may respond to selection (for example, a touch input) of one of the displayed state input affordances ia1, ia2, and ia3 and display a plurality of detailed information input affordances sa matching the selected affordance ia1.

One of the plurality of state input affordances ia1, ia2, and ia3 may operate as a button that executes displaying the detailed information input affordance for inputting the type of disaster. Another one of the plurality of state input affordances ia1, ia2, and ia3 may operate as a button that executes displaying the detailed information input affordance related to the user's exercise ability. Yet another one of the plurality of state input affordances ia1, ia2, and ia3 may operate as a button that executes displaying the detailed information input affordance related to the personal conditions of the user.

The detailed information input affordance for inputting the type of disaster may be used as a button for inputting information such as earthquake, fire, or hazardous material leakage.

The detailed information input affordance related to the user's exercise ability may be used as a button for inputting information such as "I cannot walk, I cannot climb, I cannot run, or I have my leg injured." In addition, the detailed information input affordance related to personal conditions of the user may be used as a button for inputting information such as "children under a certain age, a hearing-impaired person, an accompanying child, a wheelchair, or a stroller." The user may input specific information related to the type of the current disaster, the user's current exercise ability, and personal conditions by selecting one of the plurality of displayed detailed information input affordances sa.

The mobile device 100 may transmit the input specific information related to the type of disaster, the user's exercise ability, and personal conditions and current location information of the mobile device 100 to the server 200.

The server 200 may determine a plurality of evacuation routes from the current location of the mobile device 100 to an evacuation point based on the received specific information related to the type of disaster, the user's exercise ability, and personal conditions; and the location information of the mobile device 100.

The server 200 may determine an appropriate evacuation route based on the specific information related to the type of disaster, the user's exercise ability, and personal conditions.

For example, the server 200 may determine an optimal evacuation route to an available evacuation point in the occurrence of fire among evacuation points registered in advance. In addition, if the user has a leg injury, is moving in a wheelchair, or is pushing a stroller, the server 200 determines that the user is unable to use stairs and determines an evacuation route that avoids the stairs. In addition, if the server 200 determines that it is necessary to provide additional evacuation guidance assistance information to the user, such as when the user is a child under a specific age or a hearing-impaired person, the server 200 may determine an evacuation route that passes an area in which an evacuation guidance assisting device 300 is located.

The server 200 may generate a plurality of evacuation route information and determine their priorities. The server 200 may determine the priority of the plurality of evacuation route information based on specific information related to the type of disaster, the user's exercise ability, and personal conditions.

The server 200 may provide the plurality of determined evacuation route information to the mobile device 100.

The evacuation guidance interface 110 displays an evacuation route with the highest priority among the plurality of evacuation routes received from the server 200 in response to the selection of the displayed route reconfiguration affordance ra by superimposing the evacuation route on the map displayed in advance on the map display area 112.

In various embodiments, when the evacuation guidance interface 110 receives the selection of the route reconfiguration affordance ra again after displaying an evacuation route, the evacuation guidance interface 110 may display another evacuation route of the second-highest priority among the evacuation routes displayed. Accordingly, the user may change the displayed evacuation route by selecting the route reconfiguration affordance ra.

In various embodiments, the evacuation guidance interface 110 may additionally display priority information of the displayed evacuation routes.

Figure 4:
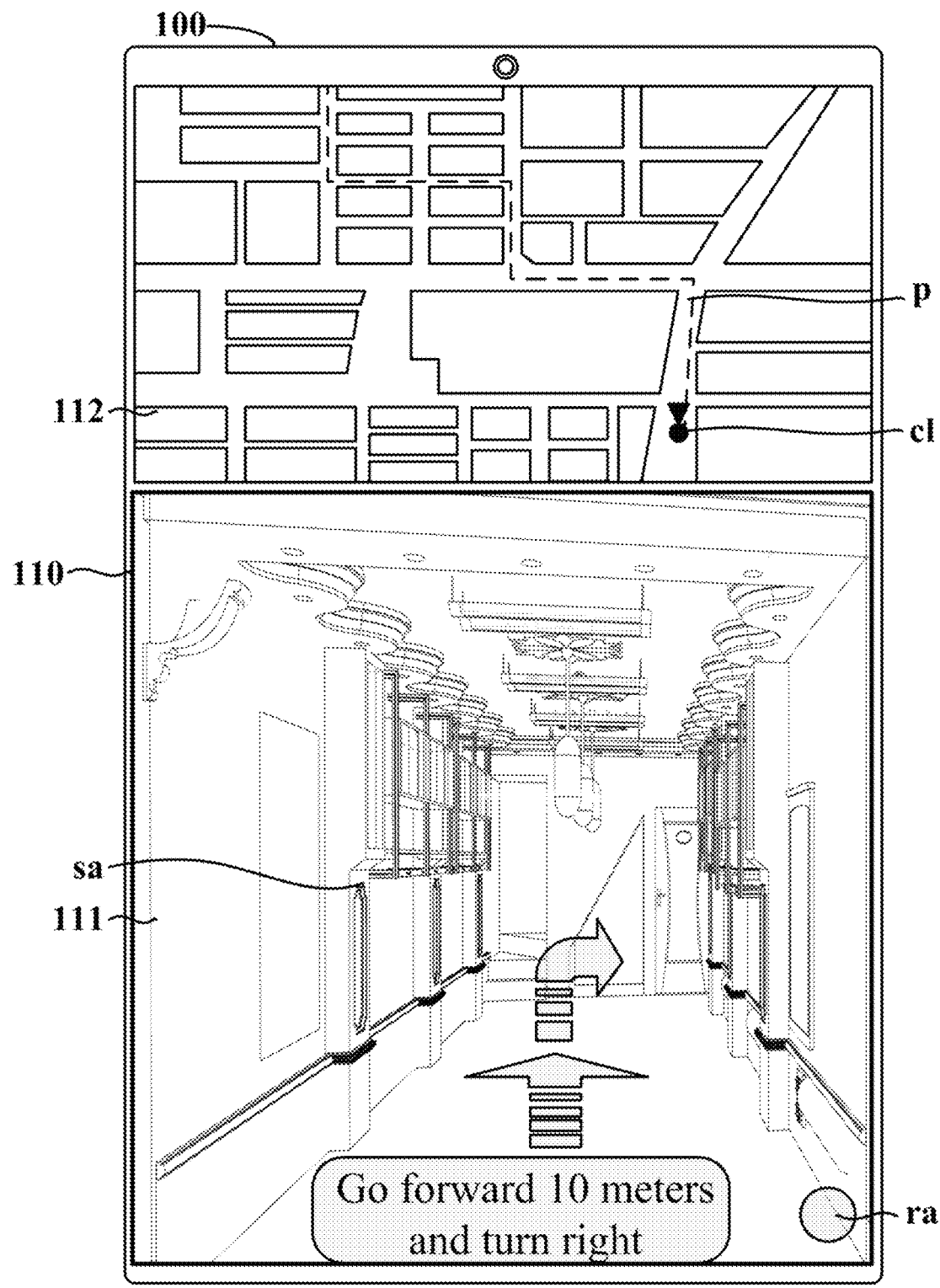

Referring to FIG. 4, the evacuation guidance interface 110 may display movement direction guide information superimposed on the landscape image in the image display area 111 based on the location information of the mobile device 100 and the inclination angle information of the mobile device 100.

For example, the evacuation guidance interface 110 may guide a movement direction for the user by displaying a route to be followed from the current location of the mobile device 100 along an evacuation route using a means such as an arrow symbol.

The evacuation guidance interface 110 may display the image captured by the mobile device 100 on the image display area 111 and superimpose a movement direction to be followed from the current location along an evacuation route and evacuation route guide information on the movement distance on the displayed image. The mobile device 100 guides the user to move in the correct direction along the evacuation route by appropriately changing the evacuation route guide information based on the location and inclination angle of the mobile device 100.

Figure 5:
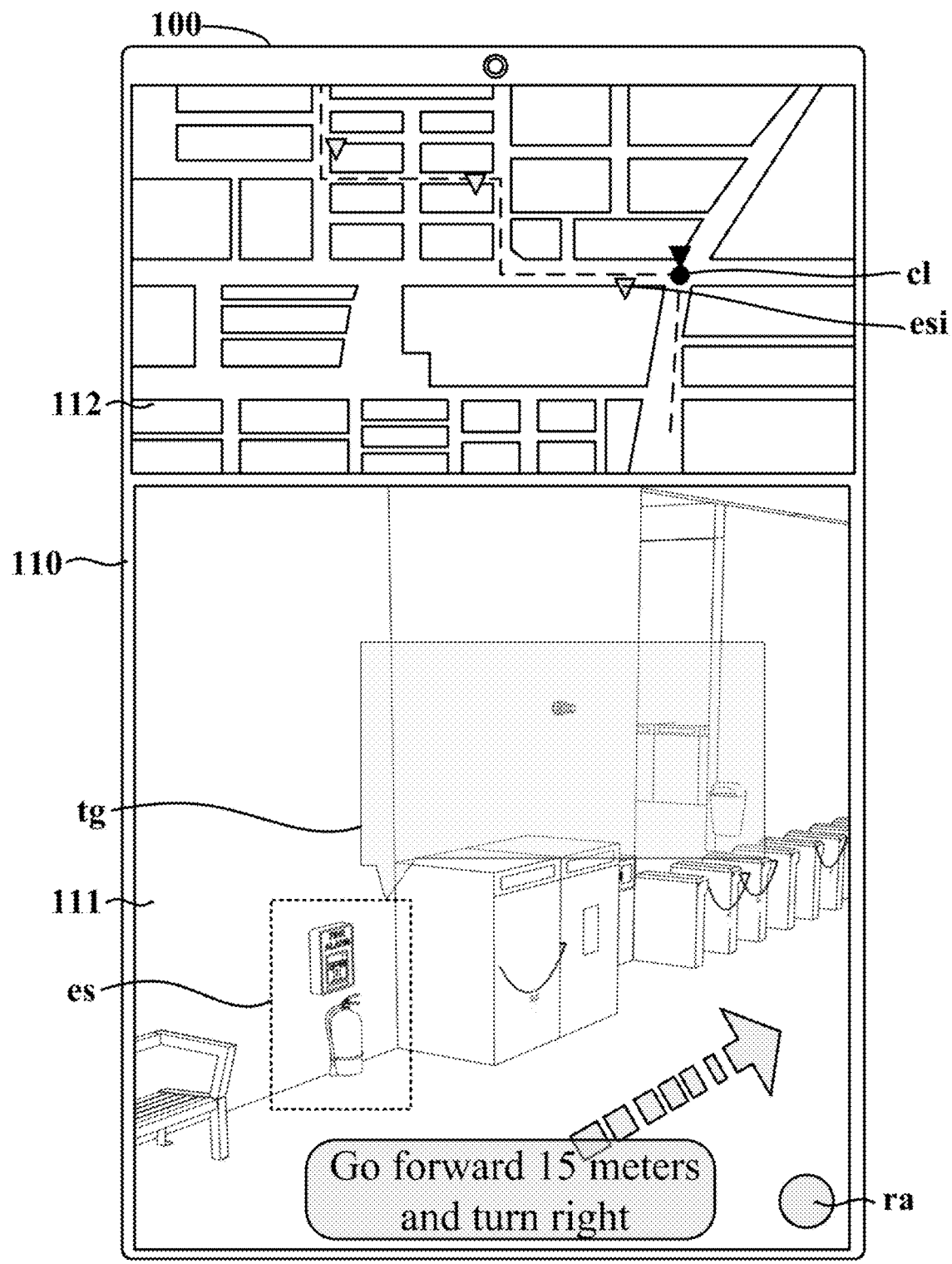

Referring to FIG. 5, the evacuation guidance interface 110 may display location information of at least one emergency item located on the evacuation route on the map display area 112. In various embodiments, when the evacuation route information displayed on the map display area 112 is confirmed, the mobile device 100 may receive, from the server 200, location information of the emergency items located on the evacuation route to be displayed. Also, when the evacuation route information displayed on the map display area 112 is changed, the mobile device 100 may receive location information of the emergency items located on the changed evacuation route from the server 200.

For example, when the type of disaster received is fire, the evacuation guidance interface 110 may display, on the map display area 112, only the emergency items located on the evacuation route displayed on the map display area 112 by filtering location information of a plurality of emergency items on the map received from the server 200.

In various embodiments, the evacuation guidance interface 110 may display an icon esi of an emergency item in a form easy for identifying the type of emergency item at the location of the corresponding emergency item on the map display area 112.

If the evacuation guidance interface 110 determines that the mobile device 100 is located at a point of a route matching the location where an emergency item is disposed, the evacuation guidance interface 100 may analyze captured images to determine whether the emergency item is detected in the captured images. When the mobile device 100 detects an emergency item in the captured images, the evacuation guidance interface 110 may perform various additional displays to help the user quickly identify the emergency item es (according to the illustrated example, a rectangular bounding box enclosing the emergency item may be displayed). Also, the evacuation guidance interface 110 may display a tag tg including information on how to use the emergency item es on the image display area 111. The tag tg may be displayed around the detected emergency item es.

Figure 6:
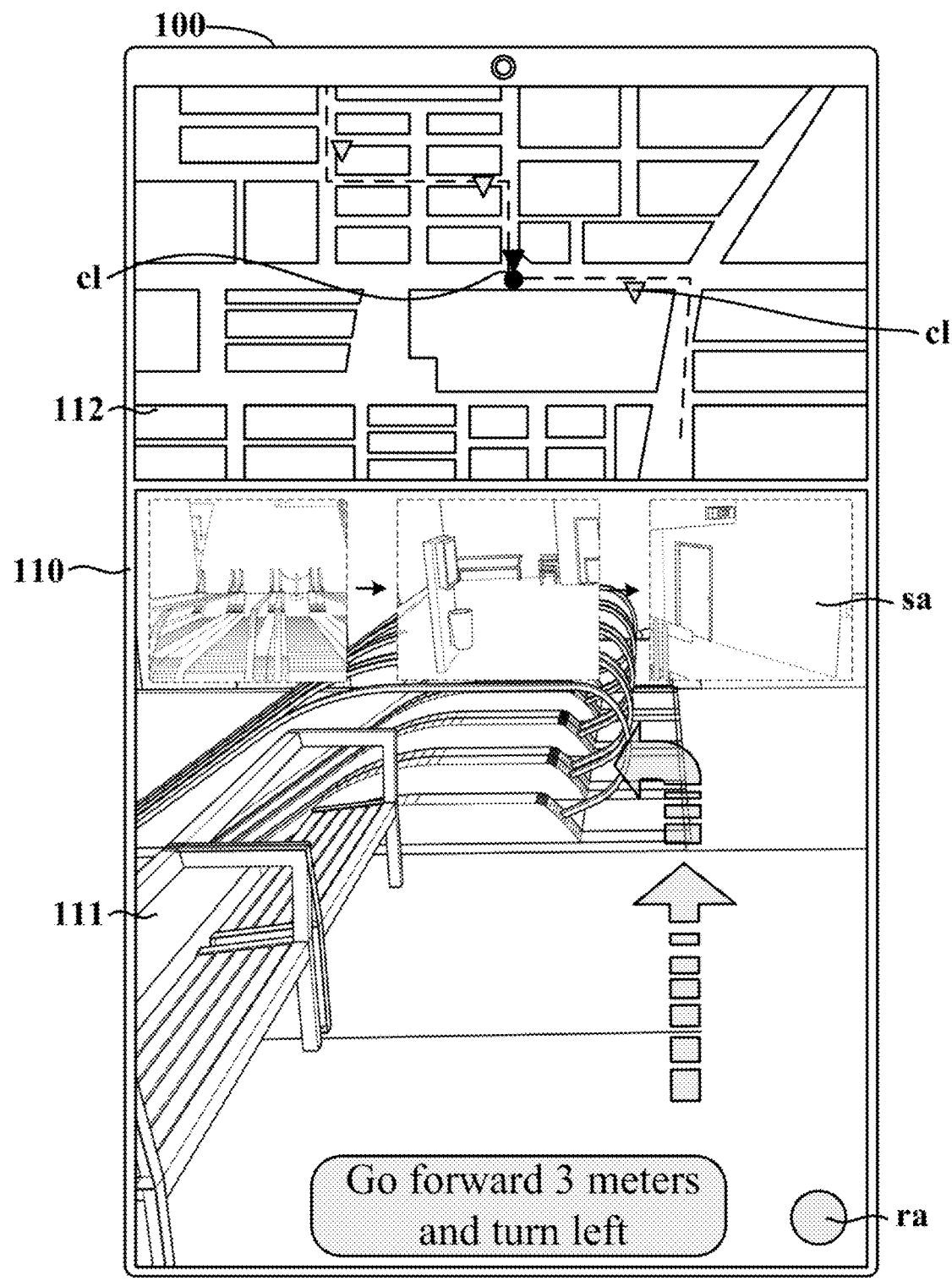

Referring to FIG. 6, the server 200 may receive, from the mobile device 100, evacuation route information currently displayed on the mobile device 100. In addition, the server 200 may periodically receive, from the mobile device 100, the current location of the mobile device 100. Also, the server 200 may periodically receive from the mobile device 100 an image captured by the mobile device 100 and information on the location at which the mobile device 100 captures the image. In various embodiments, for fast data transmission and reception, an image may be transmitted from the mobile device 100 to the server 200 in the form of image data.

The server 200 may transmit waypoint state image data to the mobile device 100, which is the image information captured by other users' mobile devices at a plurality of different points on the evacuation route from the current location of the mobile device 100 to the evacuation point. In various embodiments, the server 200 may transmit the captured image to the mobile device 100 in the form of image data.

Figure 7:
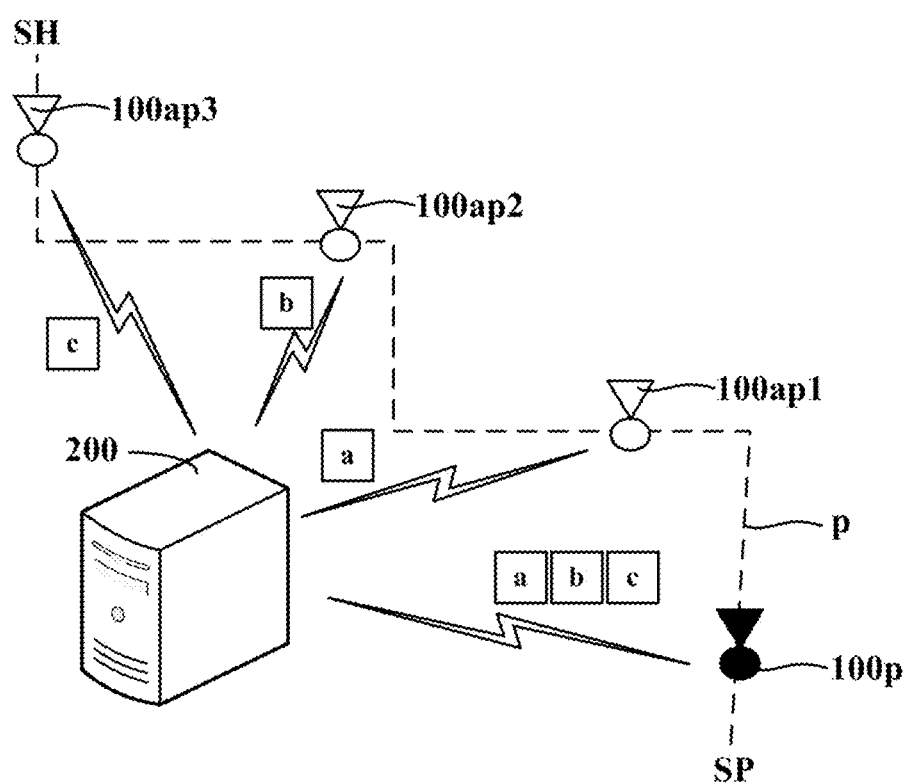
FIG. 7 illustrates a method for displaying waypoint state images.

FIG. 7 illustrates a method for displaying waypoint state images.

Referring to FIGS. 6 and 7 by collecting image data taken through a plurality of mobile devices on the evacuation route, the server 200 may receive, over the evacuation route p from a start point SP to an evacuation point SH, images a, b, c captured by other users' mobile devices 100ap 1, 100ap2, 100ap3 located at different points on the route from the current location of the user's mobile device 100p to the evacuation point SH. Then, the server 200 may transmit the waypoint state image data, which is the received image a, b, c, to the user's mobile device 100p. According to the illustrated example, the server 200 transmits images received from three mobile devices 100ap1, 100ap2, and 100ap3 of other users to the user's mobile device 100p. However, the present disclosure is not limited to the example. The number of images transmitted from the server 200 to the user's mobile device 100p may be changed based on the remaining distance from the current location of the user's mobile device 100p to the evacuation point SH, the number of other users' mobile devices on the remaining route from the current location to the evacuation point, and separation distances among positions of other users' mobile devices.

The mobile device 100 may receive the waypoint state image data from the server 200 and display the received image on the mobile device 100. According to various embodiments, the map display area 112 may display the location where each of the plurality of waypoint state images has been captured.

The user may check the images of a plurality of points on the remaining evacuation route on the mobile device 100. In addition, images for a plurality of points on the remaining route may be periodically updated as the location of the mobile device 100 is changed. The user may check, through the images, the information on the states of people at a plurality of points evacuating along the remaining route, the surrounding environment, and whether or not they are safe. When the user determines that one point of the evacuation route is inappropriate, the user may change the displayed evacuation route by selecting the route reconfiguration affordance ra to reconfigure an evacuation route and move through another evacuation route.

Figure 8:
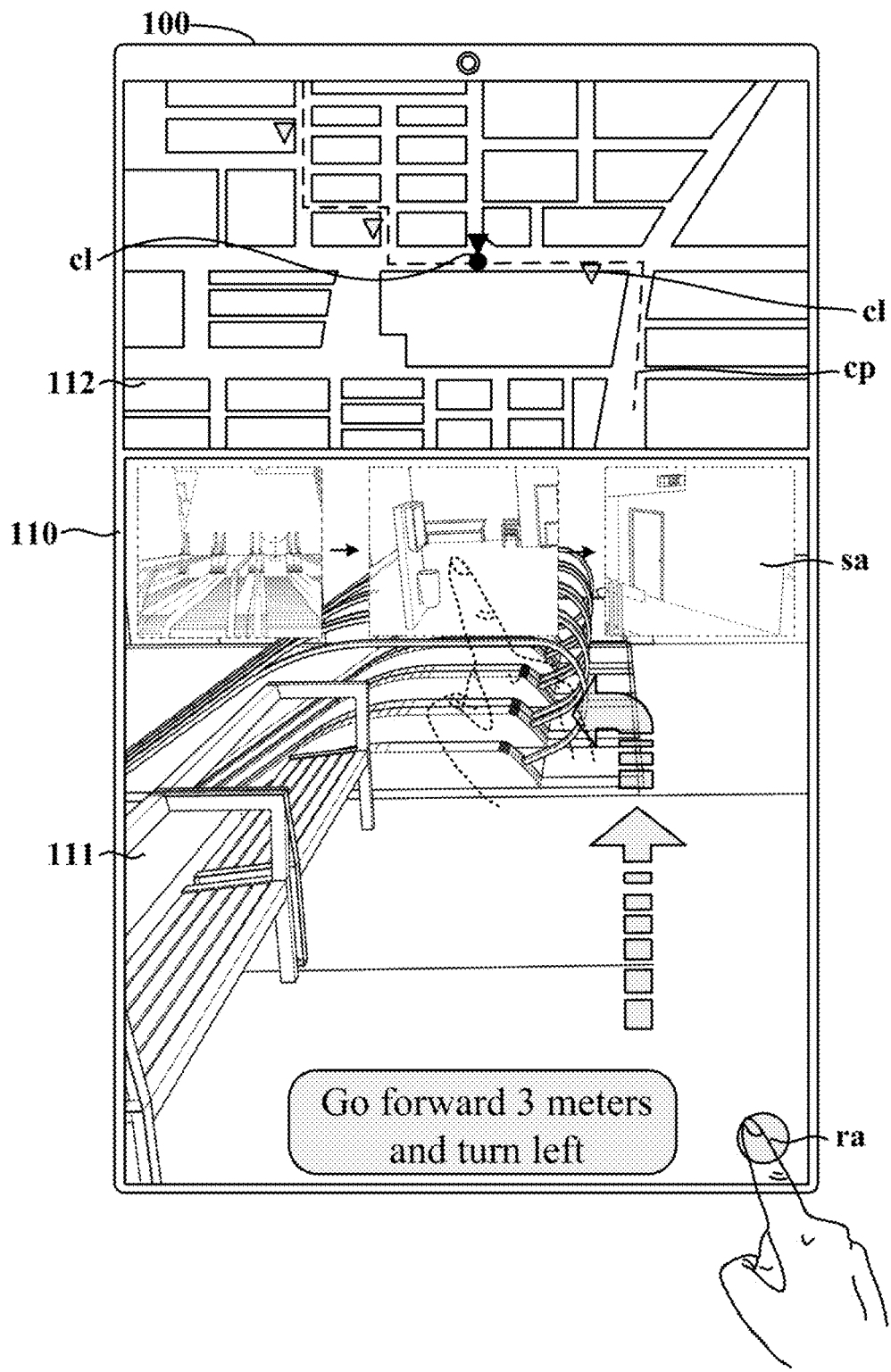
FIG. 8 illustrates an evacuation guidance interface related to a method for reconfiguring an evacuation route.

FIG. 8 illustrates an evacuation guidance interface related to a method for reconfiguring an evacuation route.

Referring to FIG. 8, in various embodiments, the evacuation guidance application 100a may change the evacuation route and display an evacuation route cp detouring a selected point on the image in response to the selection of one of the images of a plurality of points on the displayed remaining route and the selection of a route reconfiguration affordance ra. Specifically, the evacuation guidance application 100a may extract evacuation route information that does not include a shooting point on a selected image from among a plurality of evacuation route information and display an evacuation route cp with a high priority among the extracted evacuation routes. Therefore, if the user determines that a particular point is inappropriate as a movement route while checking the images for a plurality of points on the displayed remaining route, the user may reconfigure an evacuation route detouring the corresponding point by selecting the route reconfiguration affordance ra that has selected the image of the corresponding point and evacuate by detouring through the reconfigured evacuation route.

Figure 9:
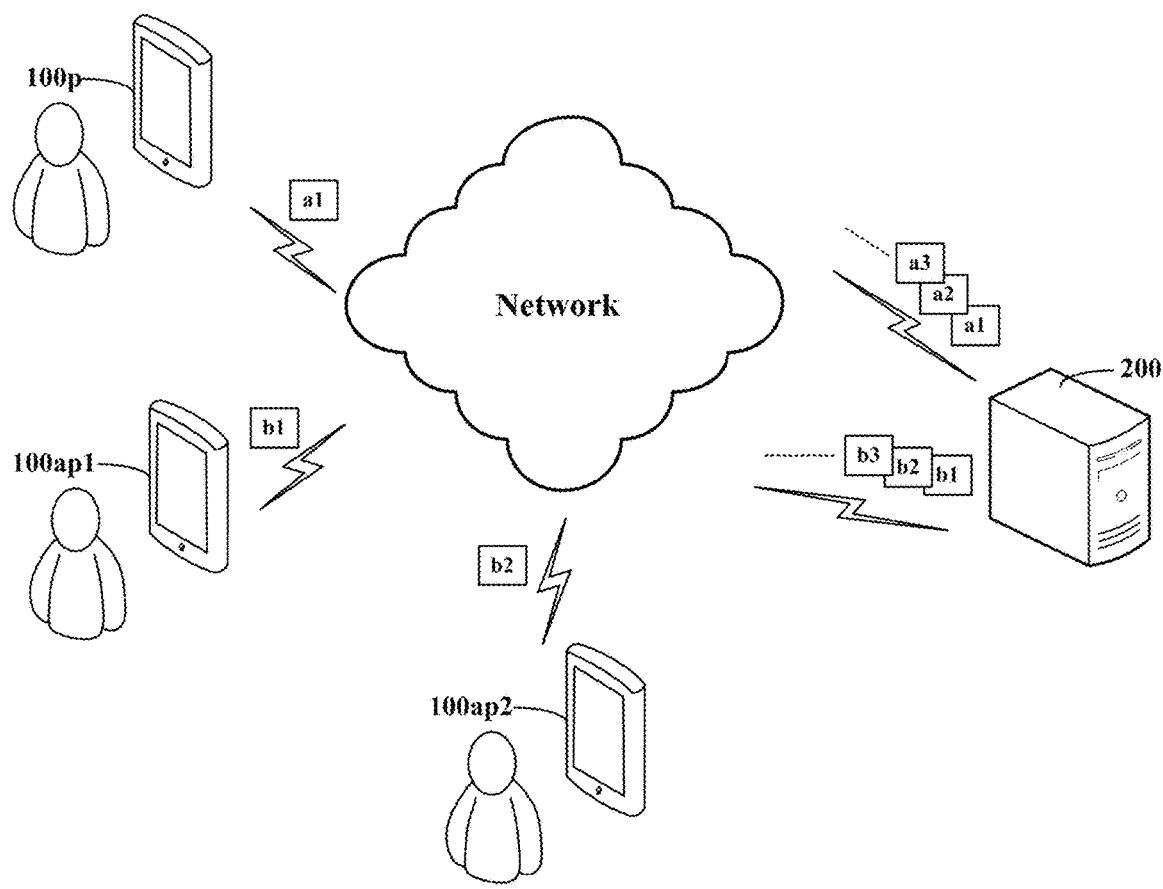
FIG. 9 illustrates a system according to an embodiment for describing a method for a server to receive image data from a plurality of mobile devices and analyze environmental state information.

FIG. 9 illustrates a system according to an embodiment for describing a method for a server to receive image data from a plurality of mobile devices and analyze environmental state information.

Referring to FIG. 9, the server 200 may receive image data captured by a plurality of users moving on the same evacuation route. The server 200 may periodically receive image data captured at each of a plurality of points on the evacuation route. After receiving image data captured at one of the plurality of points multiple times, the server 200 may analyze the plurality of images to detect environmental state information of the corresponding point. The environmental state information may include information on whether or not there is a fire at the corresponding point and the density of people. However, the present disclosure is not limited to the specific example and may further include information used to determine whether it is appropriate for an evacuee to move to the corresponding point.

To determine the occurrence of fire at a particular point by analyzing a plurality of images, the server 200 may extract the features of smoke and flames using the Convolutional Neural Network (CNN). However, the present disclosure is not limited to the specific example above and may use various methods as long as they are capable of analyzing images and determining the occurrence of fire at a point on the image and whether people may move considering the fire. Also, the server 200 may analyze a plurality of images using a deep-learning network to detect the density of people at a point on the image.

As described above, when the server 200 determines that an analyzed point is an avoidance point inappropriate or impossible for people to move through, the server may transmit a request for reconfiguring an evacuation route, location information of the avoidance point, and image data capturing the avoidance point to the mobile device(s) displaying the evacuation route to which the avoidance point, a point determined as being inappropriate or impossible to move through, belongs among mobile devices of a plurality of users.

Figure 10:
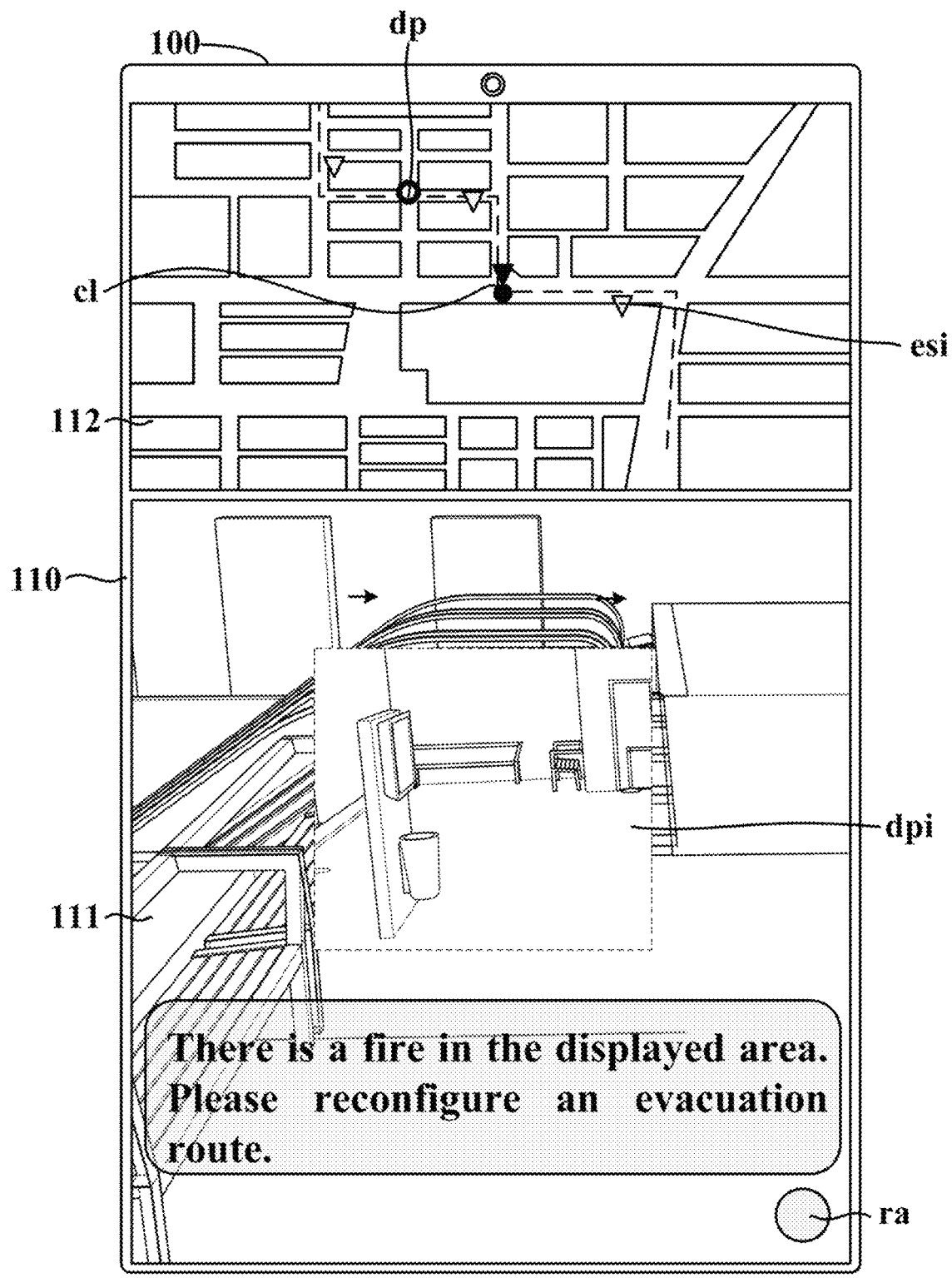
FIG. 10 illustrates an evacuation guidance interface related to displaying avoidance points and guidance tags for reconfiguring a route.

FIG. 10 illustrates an evacuation guidance interface related to displaying avoidance points and guidance tags for reconfiguring a route.

Referring to FIG. 10, the mobile device 100 may display a received avoidance point dp on the map display area 112. In addition, the mobile device 100 may display the image dpi of the received avoidance point and display a guidance tag (for example, "There is a fire in the displayed area. Please reconfigure an evacuation route." as shown in the figure).

The user checks the image dpi at the displayed avoidance point to determine whether it is possible to pass the point designated as an avoidance point considering the user's physical condition. If the user determines that it is impossible to pass through the avoidance point, the user may evacuate through an alternative route obtained by reconfiguring the evacuation route.

Referring again to FIG. 1, in various embodiments, at least one evacuation guidance assisting device 300 may be installed on the evacuation route.

The evacuation guidance assisting device 300 may be installed on the ceiling or passageways inside a building and guide people to an emergency exit or an escape place in a disaster situation such as fire or earthquake.

The evacuation guidance assisting device 300 may be paired with at least one mobile device 100 within a preconfigured radius. When the user arrives at a location adjacent to the evacuation guidance assisting device 300 while moving along the evacuation route, the evacuation guidance assisting device 300 may be automatically paired with the mobile device 100 carried by the user. The evacuation guidance assisting device 300 may receive specific information related to the type of disaster, the user's exercise ability, and personal conditions from the paired mobile device 100. For example, if the user is hearing-impaired, the evacuation guidance assisting device 300 may output visual information related to movements along the user's evacuation route or specific actions to be taken due to a disaster situation while the user is moving along the route. Also, if the user is a child under a specific age, the evacuation guidance assisting device 300 may display text or images related to movements along the evacuation route or specific actions to be taken due to a disaster situation while the child is moving along the route in a form easy for children to understand.

The evacuation guidance assisting device 300, being paired with the user's mobile device 100 located within a preconfigured radius, may provide messages suitable for the user's conditions and current situation considering the type of disaster, the user's exercise ability, and the user's conditions, thereby enabling the user to evacuate safely and quickly in a disaster situation.

Figure 11:
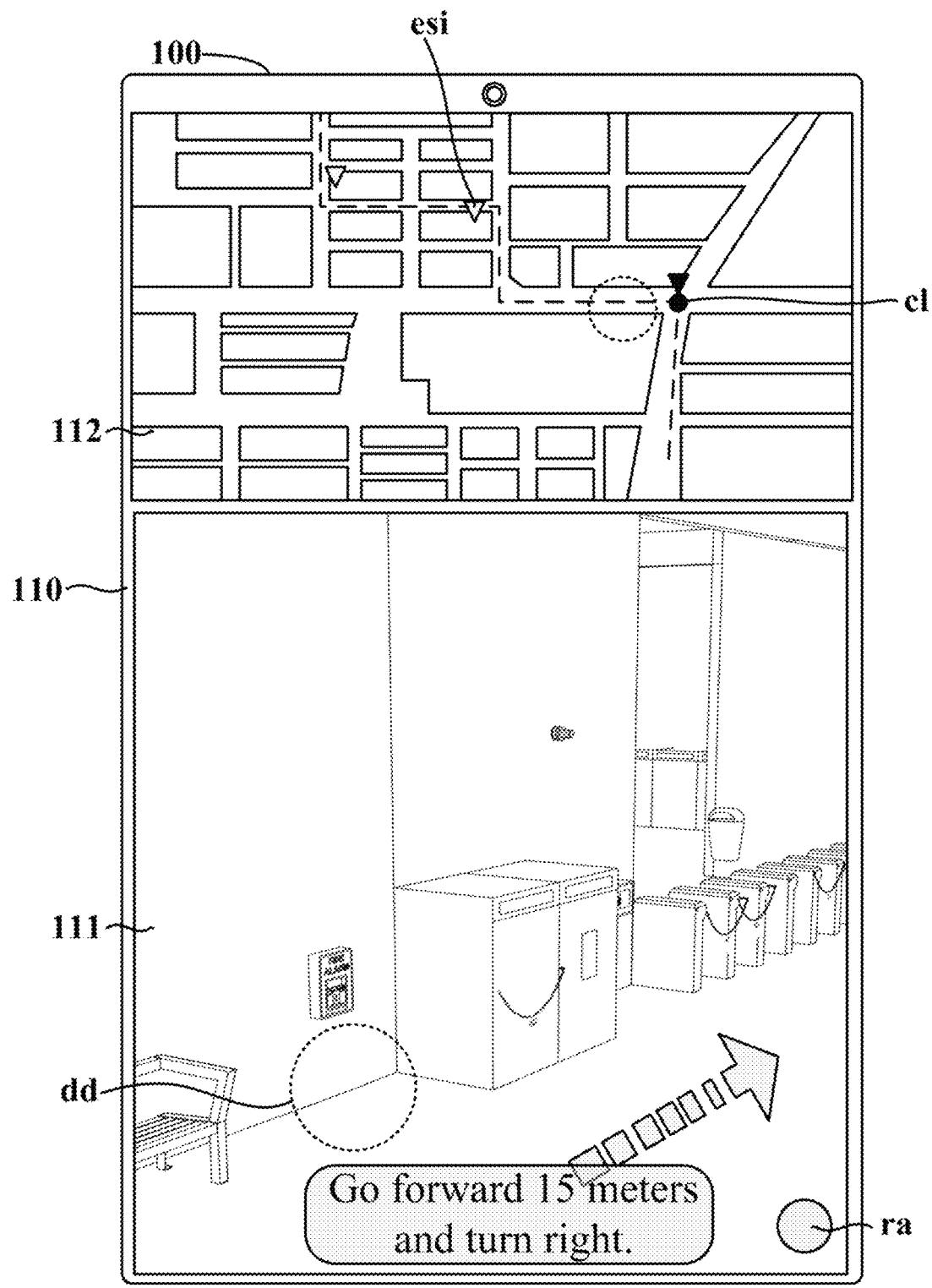
FIG. 11 illustrates an evacuation guidance interface for describing a method for detecting a state in which an emergency item has been removed and removing location information of the emergency item from an evacuation route.

FIG. 11 illustrates an evacuation guidance interface for describing a method for detecting a state in which an emergency item has been removed and removing location information of the emergency item from an evacuation route.

Referring to FIGS. 5 and 11, if the evacuation guidance interface 110 determines that the mobile device 100 is located at a point of a route matching the location where an emergency item is disposed, the evacuation guidance interface 100 may analyze captured images to determine whether the emergency item is detected in the captured images.

Suppose a user has used an emergency item disposed on an evacuation route. In this case, the evacuation guidance interface of a mobile device 100 of a person following the user determines that the mobile device is located on one point of the route matching the location where the emergency item is disposed and analyzes captured images. However, since the emergency item has already been used, the emergency item is not detected in the captured images. In this case, the corresponding mobile device may transmit the use completion information of the emergency item and the location of the used emergency item to the server 200. When the server 200 receives the use completion information of the emergency item and the location information of the used emergency item, the server 200 may transmit information of the used emergency item and location information of the used emergency item to the mobile devices of all occupants communicating with the server 200.

Among the mobile devices that have received the information of the used emergency item and the location information of the used emergency item, mobile devices displaying the evacuation route to which the location of the used emergency item belongs may update the location information of the emergency item by removing an icon esi of the emergency item from the evacuation route, which is indicated by a dotted circle on the map display area 112 of FIG. 11.

Figure 12:
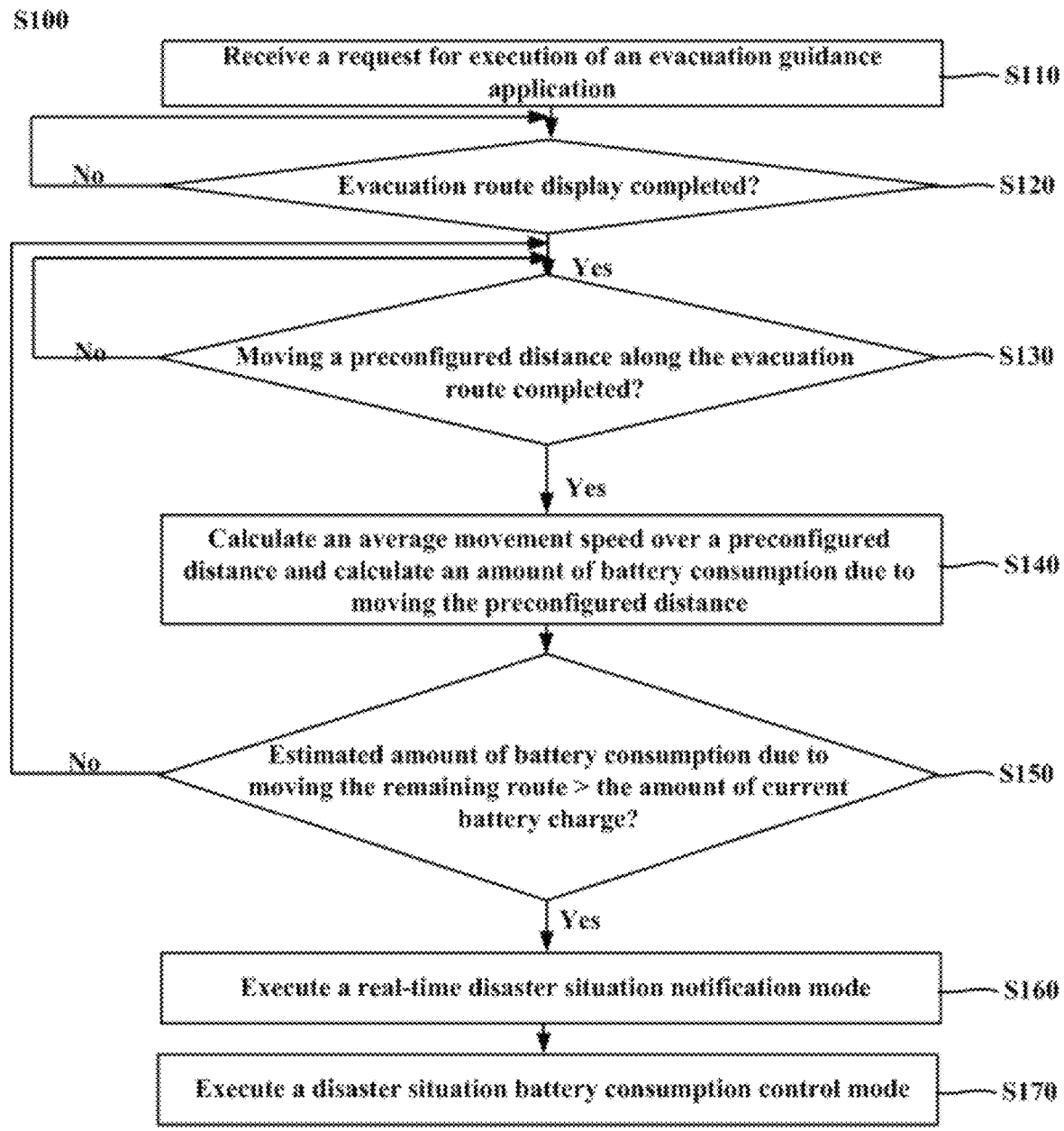
FIG. 12, FIG. 13 and FIG. 14 is a flow diagram illustrating execution of a real-time disaster situation notification mode and a disaster situation battery consumption control mode according to a method for guiding an evacuation route for occupants using augmented reality of mobile devices.
Figure 13:
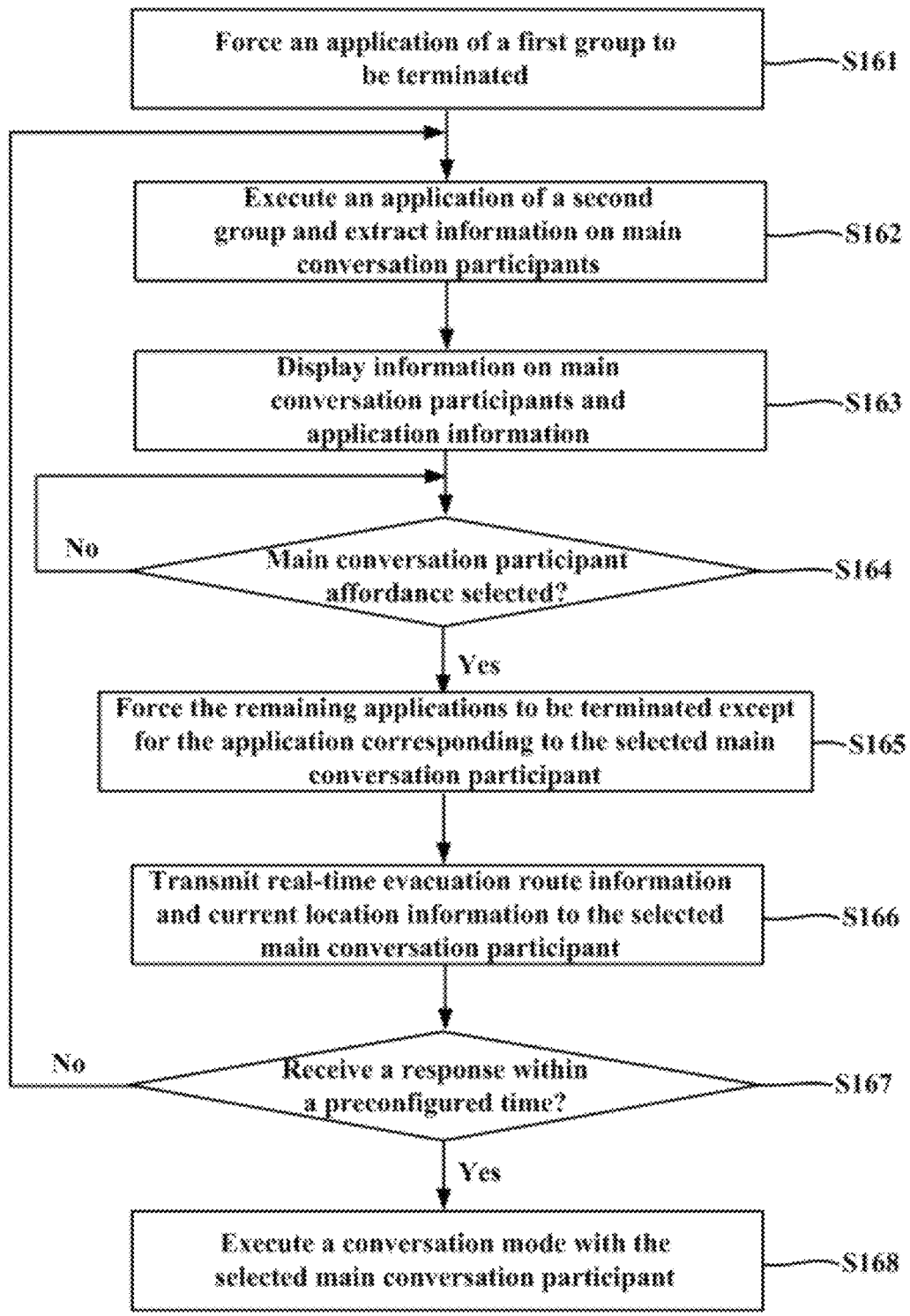
Figure 14:
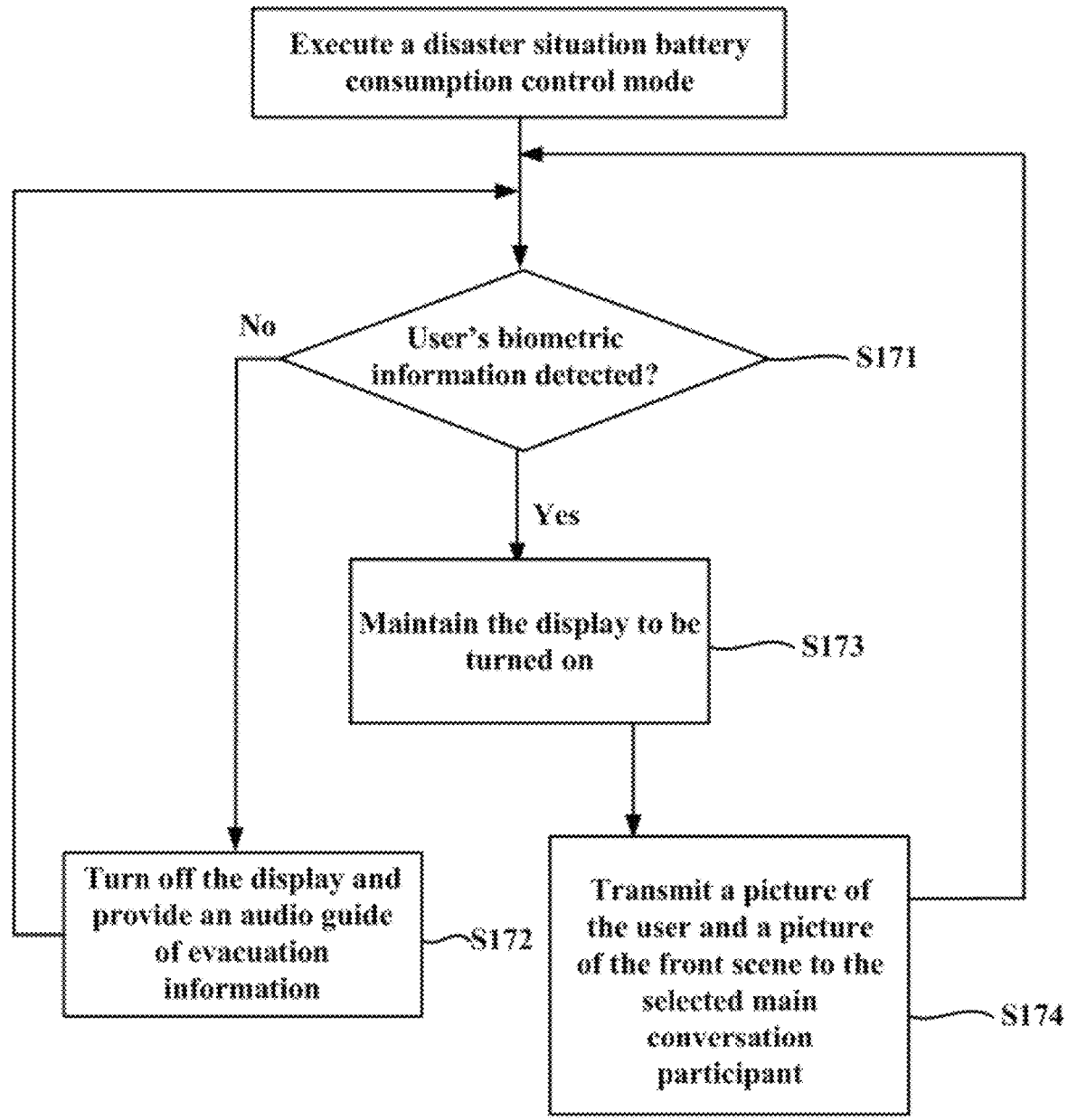
Figure 15:
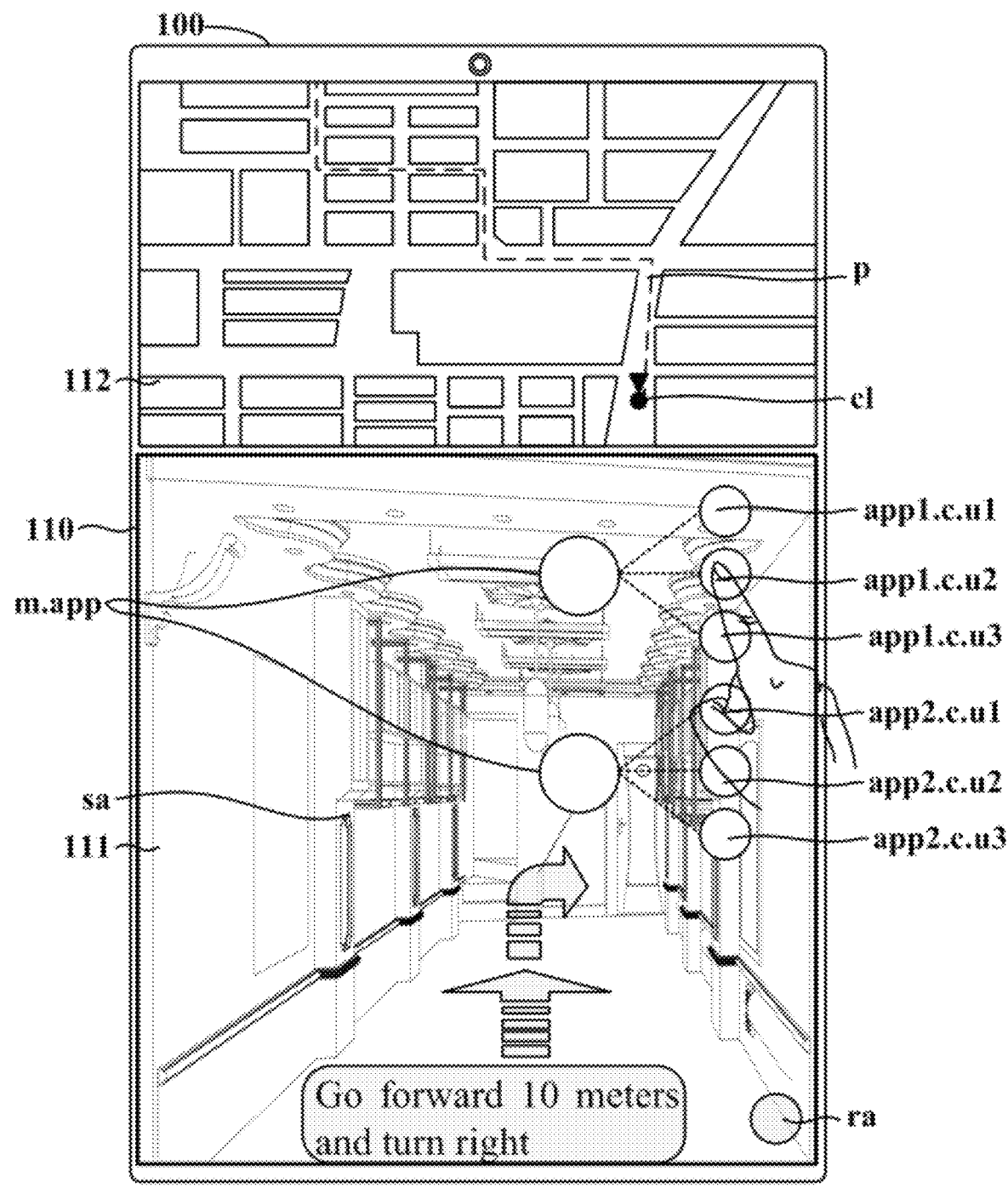
FIG. 15 and FIG. 16 illustrate an evacuation guidance interface according to execution of a real-time disaster situation notification mode.
Figure 16:
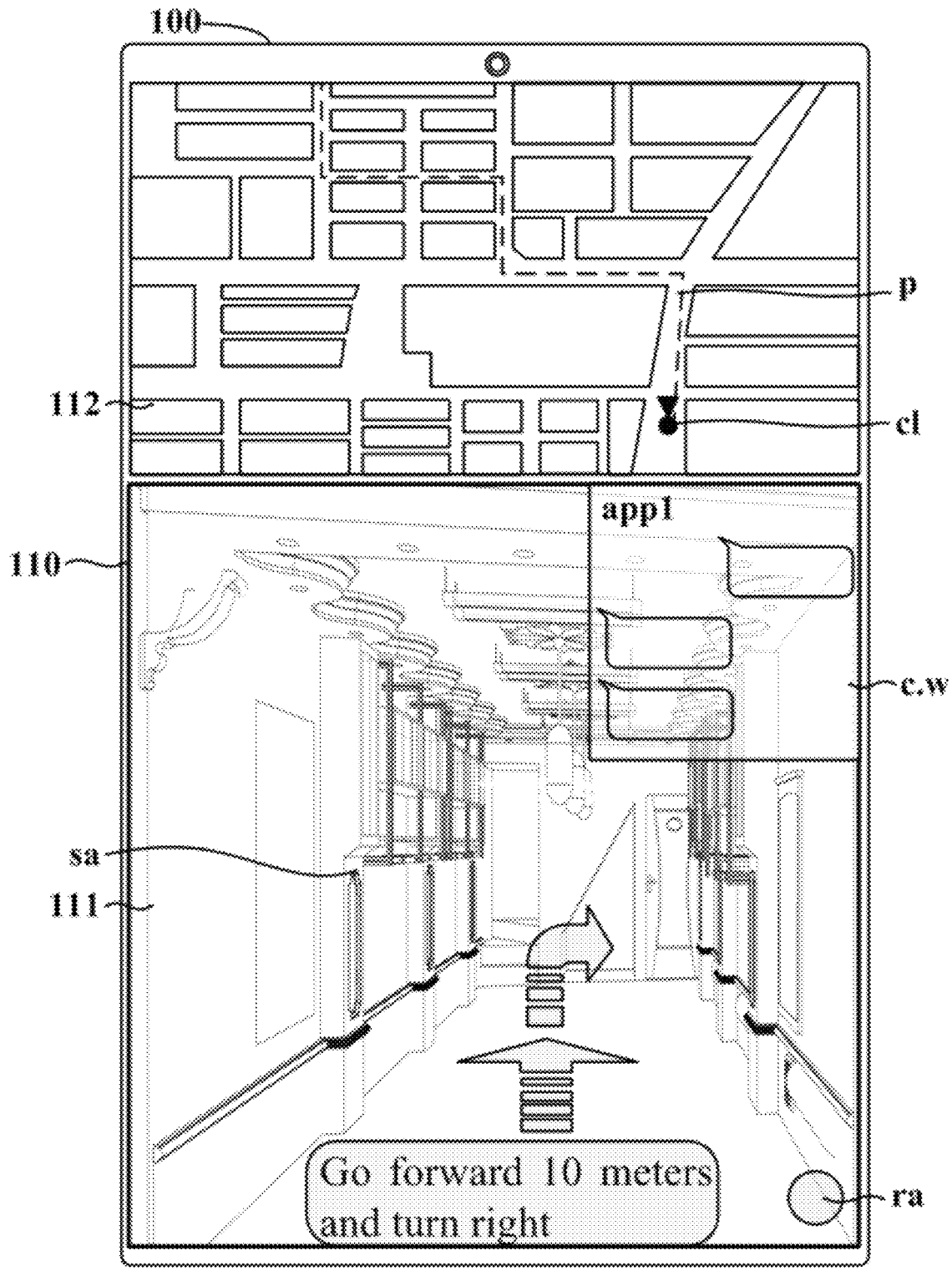

FIGS. 12 to 14 is a flow diagram illustrating execution of a real-time disaster situation notification mode and a disaster situation battery consumption control mode according to a method for guiding an evacuation route for occupants using augmented reality of mobile devices. FIGS. 15 and 16 illustrate an evacuation guidance interface according to execution of a real-time disaster situation notification mode.

Referring to FIG. 12, in a method for guiding an evacuation route for occupants using augmented reality of mobile devices, a method for executing a real-time disaster situation notification mode and a disaster situation battery consumption control mode S100 may include the following steps. First, the mobile device 100 may execute S110 an evacuation guidance application 100a in response to a request to execute the evacuation guidance application 100a and determine whether displaying an evacuation route p has been completed S120. When the mobile device 100 determines that displaying the evacuation route p has been completed, the mobile device 100 may determine periodically whether a user has moved a predetermined distance along the evacuation route p based on the location information of the mobile device 100 S130. When the mobile device 100 determines that the user has moved the predetermined distance along the evacuation route p, the mobile device 100 may calculate an average movement speed due to moving the predetermined distance and calculate the amount of battery consumption of the mobile device 100 consumed while the user moves the predetermined distance S140. The mobile device 100 may calculate an estimated amount of battery consumption due to movement along the remaining route based on the average movement speed due to moving the predetermined distance and the amount of battery consumption of the mobile device 100 consumed while the user moves the predetermined distance S140. In other words, the mobile device 100 may calculate an estimate of the amount of battery consumption due to moving the remaining route on the evacuation route p.

Next, the mobile device 100 may determine whether an estimate of the amount of battery consumption due to moving the remaining route exceeds the amount of current battery charge S150.

When the estimate of the amount of battery consumption due to moving the remaining route exceeds the amount of current battery charge, the mobile device 100 may return to the S130 step in which the mobile device 100 determines whether a user has moved a predetermined distance along the evacuation route p from the user's current location.

While the user moves the evacuation route p, the process above is repeated periodically. Therefore, whether the amount of battery charge of the mobile device 100 is sufficient may be monitored to maintain the mobile device 100 to be in an active state until the mobile device 100 arrives at an evacuation place.

When the mobile device 100 determines that an estimate of the amount of battery consumption due to moving the remaining route is less than the amount of current battery charge, the mobile device 100 may execute the real-time disaster situation notification mode and the disaster situation battery consumption control mode S160, S170.

Referring to FIGS. 13, 15, and 16, each of the following steps may be executed in the real-time disaster situation notification mode S160 of the mobile device 100.

When a preconfigured application of a first group is run in the background mode, the mobile device 100 may reduce the amount of battery consumption by forcing the application of the first group to be terminated S161. Here, the application of the first group means an additional application required to operate the evacuation guidance application 100a and the remaining applications except for a messenger application.

The mobile device 100 may execute an application of a second group and extract information on main conversation participants who have conducted a conversation for a predetermined period S162. Here, the application of the second group may be a messenger application having use records for a predetermined period from a current time.

The mobile device 100 extracts information on a plurality of main conversation participants and expands the range of selection of appropriate conversation participants to whom the user provides a notification about a current disaster situation.

As shown in FIG. 15, the mobile device 100 superimposes icons (m.app) of applications in the second group on the image display area 111 and displays main conversation participant affordances (app1.c.u1, app1.c.u2, app1.c.u3, app2.c.u1, app2.c.u2, app2.c.u3) extracted within the messenger applications corresponding to the respective icons (m.app). The mobile device 100 may determine whether one of the main conversation participant affordances (app1.c.u1, app1.c.u2, app1.c.u3, app2.c.u1, app2.c.u2, app2.c.u3) displayed is selected (for example, a touch input) S164. In response to one selection from the main conversation participant affordances (app1.c.u1, app1.c.u2, app1.c.u3, app2.c.u1, app2.c.u2, app2.c.u3) displayed, the mobile device 100 may force the remaining messenger applications to be terminated except for the messenger application corresponding to the selected main conversation participant affordance app1.c.u2 S165. The mobile device 100 may transmit map information displayed on the map display area 112, evacuation route information, and the user's current location to the main conversation participant selected through the messenger application S166.

The mobile device 100 may determine whether a response is received from the selected main conversation participant within a predetermined period S167. Suppose the mobile device 100 receives no response from the selected main conversation participant within the predetermined period. In that case, the mobile device 100 may return to the S162 step to execute the application of the second group and extract information on the remaining main conversation participants except for the selected conversation participant. Suppose the mobile device 100 receives a response from the selected main conversation participant within the predetermined period. Then the mobile device 100 displays a conversation mode window c.w for the selected main conversation participant by superimposing the window on the image display area 111 as shown in FIG. 16 and executes the conversation mode with the selected main conversation participant, displaying message information from the selected main conversation participant S168.

Referring to FIG. 14, the mobile device 100 may determine S171 whether the user's biometric information is detected according to the execution of the disaster situation battery consumption control mode S170. Here, the biometric information may be the user's face information or the user's iris information registered in advance for unlocking the mobile device 100 using a front camera device of the mobile device 100. When the user's biometric information is detected, the mobile device 100 may maintain the turn-on state of the display S173. In addition, the mobile device 100 may periodically transmit a picture of the user captured with the front camera and a picture of the front scene to the selected main conversation participant S174. If the user's biometric information is not detected, the mobile device 100 may turn off the display to reduce battery consumption and provide an audio guide of evacuation information. In some embodiments, the mobile device 100 may measure the level of external noise and adjust the output volume of the audio guide of the evacuation information. The mobile device 100 continuously detects the user's biometric information S171 to keep the display turned on only when the user looks at the mobile device 100. When the user does not look at the mobile device 100 during the evacuation, the mobile device 100 may turn off the display to reduce battery consumption and provide an audio guide of evacuation information.

The embodiments of the present disclosure described above may be implemented in the form of program commands which may be executed through various computer elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as a ROM, a RAM, and a flash memory. Examples of program commands include not only machine codes such as those generated by a compiler but also high-level language codes which may be executed by a computer using an interpreter and the like. The hardware device may be configured to be operated by one or more software modules to perform the operations of the present disclosure, and vice versa.

Specific implementations of the present disclosure are embodiments, which does not limit the technical scope of the present disclosure in any other conceivable way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connections. Also, unless explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

DETAILED DESCRIPTION OF MAIN ELEMENTS

10: Evacuation guidance system
20: Mobile terminal
30: Smart glasses
100: Mobile device
100a: Evacuation guidance application
110: Evacuation guidance interface
111: Image display area
112: Map display area
200: Server
300: Evacuation guidance assisting device

What is claimed is:
1. A system for guiding an evacuation route using augmented reality of mobile devices, the system comprising:

an occupant's mobile device installed with an evacuation guidance application for showing an evacuation route from a current location of the occupant to an evacuation point in the occurrence of a disaster; and a server providing a plurality of evacuation route information to the mobile device, wherein the mobile device executes the evacuation guidance application to display an evacuation guidance interface, displays a captured landscape image on an image display area of the evacuation guidance interface, displays one of the plurality of evacuation routes set based on specific information related to the type of disaster, the user's exercise ability, and personal conditions on a map display area of the evacuation guidance interface and displays guide information for displaying a movement direction from a current location along an evacuation route indicated on the map display area by superimposing the guide information on the image display area together with the landscape image, wherein the mobile device receives location information of at least one emergency item related to the type of disaster from the server and displays the location information of an evacuation route on the map display area, wherein, when the mobile device is located at a point on an evacuation route displayed on the map display area that matches the location at which the emergency item is disposed, the mobile device analyzes a captured image to determine whether an emergency item is detected within the captured image; and displays an indication to facilitate identification of the emergency item when the emergency item is detected within the captured image and displays a tag including information on how to use the detected emergency item, and wherein, when the mobile device is located at a point on an evacuation route displayed on the map display area that matches the location where the emergency item is disposed, the mobile device analyzes a captured image to determine whether an emergency item is detected in the captured image; and transmits use completion information of the emergency item and location information of the emergency item completed for use to the server when the emergency item is not detected in the captured image; and to remove the location of an emergency item completed for use displayed on the evacuation route, the server transmits information of the emergency item completed for use and location information of the emergency item completed for use to the mobile devices of all occupants communicating with the server.

2. The system of claim 1, wherein the server prioritizes the plurality of evacuation routes based on specific information related to the type of disaster, the user's exercise ability, and personal conditions; and the mobile device displays one of the evacuation routes selected based on the priorities of the plurality of evacuation routes received from the server on the map display area.

3. The system of claim 1, wherein the mobile device receives waypoint state images, which are images captured by other mobile devices at a plurality of different points on the remaining route from a current location to an evacuation point, from the server and displays the received images.

4. The system of claim 3, wherein the mobile device reconfigures an evacuation route that detours a point on a waypoint state image selected in response to a selection of the displayed waypoint state image and a route reconfiguration affordance and displays the reconfigured evacuation route on the map display area.

5. The system of claim 3, wherein waypoint state images displayed on the mobile device are updated periodically according to a location change of the mobile device.

6. The system of claim 5, wherein the number of waypoint state images transmitted from the server to the user's mobile device is determined based on the remaining distance from a current location of the mobile device to the evacuation point, the number of other users' mobile devices on the remaining route from the current location to the evacuation point, and separation distances among positions of other users' mobile devices.

7. The system of claim 1, wherein the server receives captured image data for the same point photographed by each of a plurality of users moving along the same evacuation route, analyzes the plurality of captured image data to detect environmental state information of the same point and, if the same point is determined as an avoidance point through which movement is not appropriate, transmits a request for reconfiguring an evacuation route, location information of the avoidance point, and images capturing the avoidance point to mobile devices of a plurality of users moving along the same evacuation route; and the mobile device receiving the request for reconfiguring an evacuation route, location information of the avoidance point, and images capturing the avoidance point displays the avoidance point, the images capturing the avoidance point, and a guidance tag requesting reconfiguration of an evacuation route and displays an evacuation route reconfigured to avoid a point on the image capturing a displayed avoidance point in response to the selection of a route reconfiguration affordance.

8. The system of claim 1, wherein the mobile device calculates an average movement speed over a preconfigured distance and an amount of battery consumption of the mobile device consumed while moving the preconfigured distance by determining whether the movement of the preconfigured distance along the evacuation route has been completed, determines whether an estimated amount of battery consumption required for movement along the remaining route exceeds the amount of current battery charge, and executes a real-time disaster situation notification mode and a disaster situation battery consumption control mode if the estimate does not exceed the amount of current battery charge;

the mobile device displays a messenger application having use records for a predetermined period and displays information on main conversation participants who have conducted a conversation for a preconfigured time by extracting the information in the messenger application, in response to selection of the displayed information on main conversation participants who have conducted a conversation, transmits real-time evacuation route information and location information of a current user to the selected main conversation participants, and executes a conversation mode with the selected main conversation participants if a response is received from the selected main conversation participants within a preconfigured time; and the mobile device determines whether biometric information of a pre-registered user is detected, maintains a display of the mobile device to be in a turned-on state when the biometric information is detected, transmits an image photographing the user and captured image of the front scene to the selected main conversation participants, and turns off the display and provides an audio guide of evacuation information while the biometric information is not detected.

\* \* \* \* \*